(12) United States Patent
Kabra et al.

(10) Patent No.: US 10,585,865 B2
(45) Date of Patent: *Mar. 10, 2020

(54) COMPUTING THE NEED FOR STANDARDIZATION OF A SET OF VALUES

(71) Applicant: International Business Machines Corporation, Armonk, NY (US)

(72) Inventors: Namit Kabra, Hyderabad (IN); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,575

(22) Filed: Dec. 5, 2017

(65) Prior Publication Data

US 2018/0137151 A1    May 17, 2018

Related U.S. Application Data

(63) Continuation of application No. 15/349,253, filed on Nov. 11, 2016.

(51) Int. Cl.
*G06F 16/215* (2019.01)
(52) U.S. Cl.
CPC .................. *G06F 16/215* (2019.01)
(58) Field of Classification Search
CPC ......... G06F 17/30303; G06F 17/30324; G06F 16/215
See application file for complete search history.

(56) References Cited

U.S. PATENT DOCUMENTS

| 7,370,057 B2 | 5/2008 | Burdick et al. |
| 7,836,004 B2 | 11/2010 | Roth et al. |
| 8,103,679 B1 | 1/2012 | Cranfill et al. |
| (Continued) | | |

FOREIGN PATENT DOCUMENTS

WO    2015136395 A1    9/2015

OTHER PUBLICATIONS

Office Action for U.S. Appl. No. 15/349,253 dated Oct. 18, 2018, pp. 1-44.

(Continued)

*Primary Examiner* — Arpan P. Savla
*Assistant Examiner* — Maher N Algibhah
(74) *Attorney, Agent, or Firm* — Winstead PC

(57) ABSTRACT

A method, system and computer program product for determining a data standardization score for an attribute of a dataset. A data standardization score is calculated, which reflects whether data quality of attribute values would increase if a standardization rule is applied to the attribute values. Based on attribute metadata, it may be determined whether an indication to carry or not to carry out standardization is available for at least part of the attribute values of the dataset. In response to finding the indication, a respective value may be set for the data standardization score. In response to not finding the indication, a data standardization score algorithm may be run on the at least part of the attribute values of the dataset. The data standardization score value may be compared to a predefined criterion to determine whether data standardization is to be applied on the attribute.

9 Claims, 8 Drawing Sheets

(56) References Cited

U.S. PATENT DOCUMENTS

| | | | |
|---|---|---|---|
| 8,266,115 B1* | 9/2012 | Park | G06F 17/30864 707/692 |
| 8,666,998 B2 | 3/2014 | Nelke et al. | |
| 8,949,166 B2 | 2/2015 | Nelke et al. | |
| 8,996,524 B2 | 3/2015 | Chaturvedi et al. | |
| 9,037,589 B2 | 5/2015 | Anderson | |
| 9,104,709 B2 | 8/2015 | Chaturvedi et al. | |
| 2014/0067803 A1 | 3/2014 | Kapadia et al. | |
| 2014/0068768 A1* | 3/2014 | Lospinuso | G06F 21/562 726/23 |
| 2014/0279757 A1 | 9/2014 | Shimanovsky et al. | |
| 2015/0339360 A1 | 11/2015 | Nelke et al. | |
| 2016/0034502 A1 | 2/2016 | Dupey et al. | |
| 2016/0154830 A1* | 6/2016 | Papotti | G06F 17/30557 707/692 |
| 2016/0171031 A1* | 6/2016 | Kataoka | G06F 17/30336 707/741 |

OTHER PUBLICATIONS

Prasad et al., "Data Cleansing Techniques for Large Enterprise Datasets," http://ieeexplore.ieee.org/xpl/login.jsp?tp=&arnumber=5958082&url=http%3A%2F%2Fieeexplore.ieee.org%2Fxpls%2Fabs_all.jsp%3Farnumber%3D5958082, 2011 Annual SRII Global Conference, 2011, pp. 135-144.

Ed Foley, "InfoSphere Best Practices: Use InfoSphere Information Analyzer Data Classification to Understand the Quality of Your Data," http://www.ibm.com/developerworks/data/library/techarticle/dm-1018infoanalyzerquality/index.html, Oct. 21, 2010, pp. 1-9.

Shey et al., "Rethinking Data Discovery and Data Classification," Oct. 1, 2014, pp. 1-20.

List of IBM Patents or Patent Applications Treated as Related, Dec. 5, 2017, pp. 1-2.

\* cited by examiner

505

|   | AL | AM | AN | AR | AX | BA | BU | CA | CH | CO | ER | ET | EV | EX | EY | FO | HE | IB | II |
|---|----|----|----|----|----|----|----|----|----|----|----|----|----|----|----|----|----|----|----|
| 502.1 → | 0 | 0 | 0 | 1 | 0 | 0 | 0 | 0 | 0 | 1 | 0 | 0 | 0 | 0 | 0 | 0 | 0 | 0 | 1 |
| 502.2 → | 1 | 0 | 0 | 0 | 0 | 0 | 1 | 0 | 1 | 0 | 1 | 1 | 1 | 0 | 0 | 0 | 1 | 1 | 0 |
| 502.3 → | 0 | 1 | 0 | 0 | 0 | 0 | 0 | 1 | 0 | 0 | 0 | 0 | 0 | 0 | 1 | 0 | 0 | 0 | 0 |
| | 0 | 1 | 1 | 0 | 1 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 1 | 0 | 1 | 0 | 0 | 0 | 0 |
| | 0 | 1 | 1 | 0 | 1 | 0 | 0 | 0 | 0 | 0 | 0 | 0 | 0 | 0 | 0 | 0 | 0 | 0 | 0 |
| | 0 | 0 | 1 | 0 | 0 | 1 | 1 | 0 | 1 | 0 | 0 | 1 | 0 | 0 | 0 | 1 | 0 | 0 | 0 |
| | 0 | 0 | 0 | 0 | 0 | 0 | 0 | 0 | 0 | 1 | 1 | 0 | 0 | 0 | 0 | 0 | 0 | 0 | 0 |
| | 0 | 1 | 0 | 0 | 0 | 0 | 0 | 1 | 0 | 0 | 0 | 0 | 0 | 0 | 0 | 0 | 0 | 0 | 0 |
| 502.10 → | 1 | 0 | 0 | 0 | 0 | 0 | 1 | 0 | 1 | 0 | 0 | 1 | 1 | 0 | 0 | 0 | 1 | 1 | 0 |

| IM | IN | IS | LE | LI | LN | LO | LV | MA | MR | NC | NI | NV | OL | ON | OR | OT | OY | PL | RB | RD | RE |
|----|----|----|----|----|----|----|----|----|----|----|----|----|----|----|----|----|----|----|----|----|----|
| 0 | 1 | 0 | 0 | 1 | 1 | 0 | 0 | 1 | 0 | 1 | 0 | 0 | 1 | 0 | 0 | 0 | 0 | 0 | 0 | 0 | 0 |
| 0 | 0 | 0 | 1 | 1 | 0 | 0 | 0 | 1 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 1 | 1 | 0 | 0 | 0 | 0 | 0 | 1 |
| 0 | 0 | 1 | 0 | 0 | 0 | 0 | 1 | 0 | 0 | 1 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 1 | 0 | 0 | 1 | 0 | 1 | 0 | 0 |
| 0 | 0 | 1 | 0 | 0 | 0 | 0 | 0 | 1 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 1 | 0 | 0 | 0 | 0 | 1 | 1 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 1 | 1 | 0 | 0 | 0 | 0 | 0 | 0 |
| 0 | 0 | 0 | 1 | 1 | 0 | 0 | 0 | 1 | 0 | 0 | 0 | 0 | 1 | 0 | 0 | 0 | 0 | 0 | 0 | 0 | 0 |

| RK | RO | RT | RY | SA | SS | SU | TA | TE | TO | TT | UB | UR | VE | VI | VO | VR | VY | XI | XM | XP | YO |
|----|----|----|----|----|----|----|----|----|----|----|----|----|----|----|----|----|----|----|----|----|----|
| 1 | 0 | 0 | 0 | 0 | 0 | 0 | 0 | 0 | 0 | 0 | 0 | 0 | 1 | 0 | 0 | 0 | 0 | 0 | 0 | 0 | 0 |
| 0 | 1 | 0 | 0 | 0 | 0 | 0 | 0 | 1 | 0 | 1 | 0 | 0 | 1 | 0 | 0 | 0 | 0 | 0 | 0 | 0 | 0 |
| 0 | 0 | 0 | 0 | 0 | 0 | 0 | 1 | 0 | 1 | 0 | 0 | 0 | 0 | 0 | 0 | 0 | 0 | 0 | 0 | 0 | 1 |
| 0 | 0 | 0 | 0 | 1 | 1 | 0 | 0 | 0 | 0 | 0 | 0 | 0 | 0 | 0 | 0 | 0 | 0 | 1 | 0 | 0 | 0 |
| 0 | 1 | 0 | 0 | 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 1 | 0 | 0 | 0 | 0 | 0 | 0 | 0 | 0 | 0 | 0 | 0 | 1 | 1 | 0 | 0 | 0 | 0 |
| 0 | 0 | 0 | 0 | 0 | 0 | 1 | 0 | 0 | 0 | 0 | 1 | 1 | 0 | 0 | 0 | 1 | 0 | 0 | 0 | 0 | 0 |
| 0 | 0 | 1 | 0 | 0 | 0 | 0 | 0 | 0 | 0 | 0 | 0 | 1 | 0 | 1 | 0 | 0 | 0 | 0 | 0 | 0 | 0 |
| 0 | 0 | 0 | 1 | 0 | 0 | 0 | 1 | 0 | 1 | 0 | 0 | 0 | 0 | 0 | 0 | 0 | 0 | 0 | 0 | 0 | 1 |
| 0 | 1 | 0 | 0 | 0 | 0 | 0 | 0 | 0 | 0 | 0 | 0 | 0 | 0 | 0 | 1 | 0 | 0 | 0 | 0 | 0 | 0 |

Fig. 5B

|       | AL | AM | AN | AR | AX | BA | BU | CA | CH | CO | ER | ET | EV | EX | EY | FO | HE | IB | II |
|-------|----|----|----|----|----|----|----|----|----|----|----|----|----|----|----|----|----|----|----|
| 502.3 | 0  | 1  | 0  | 0  | 0  | 0  | 0  | 1  | 0  | 0  | 0  | 0  | 0  | 0  | 1  | 0  | 0  | 0  | 0  |
| 502.9 | 0  | 1  | 0  | 0  | 0  | 0  | 0  | 1  | 0  | 0  | 0  | 0  | 0  | 0  | 0  | 0  | 0  | 0  | 0  |
| 502.4 | 0  | 1  | 1  | 0  | 1  | 0  | 0  | 0  | 0  | 0  | 0  | 0  | 0  | 0  | 0  | 0  | 0  | 0  | 0  |
| 502.6 | 0  | 1  | 1  | 0  | 1  | 0  | 0  | 0  | 0  | 0  | 0  | 0  | 0  | 0  | 0  | 0  | 0  | 0  | 0  |

|       | IM | IN | IS | LE | LI | LN | LO | LV | MA | MR | NC | NI | NV | OL | ON | OR | OT | OY | PL | RB | RD | RE |
|-------|----|----|----|----|----|----|----|----|----|----|----|----|----|----|----|----|----|----|----|----|----|----|
| 502.3 | 0  | 0  | 0  | 0  | 0  | 0  | 0  | 0  | 1  | 0  | 0  | 0  | 0  | 0  | 0  | 1  | 1  | 0  | 0  | 0  | 0  | 1  |
| 502.9 | 0  | 0  | 0  | 0  | 0  | 0  | 0  | 0  | 1  | 0  | 0  | 0  | 0  | 0  | 1  | 1  | 0  | 0  | 0  | 0  | 0  | 0  |
| 502.4 | 0  | 0  | 1  | 0  | 0  | 0  | 0  | 1  | 0  | 0  | 1  | 0  | 0  | 0  | 0  | 0  | 0  | 0  | 0  | 0  | 0  | 0  |
| 502.6 | 0  | 0  | 1  | 0  | 0  | 0  | 0  | 1  | 0  | 0  | 1  | 0  | 0  | 0  | 0  | 0  | 0  | 0  | 0  | 0  | 0  | 0  |

|       | RK | RO | RT | RY | SA | SS | SU | TA | TE | TO | TT | UB | UR | VE | VI | VO | VR | VY | XI | XM | XP | YO |
|-------|----|----|----|----|----|----|----|----|----|----|----|----|----|----|----|----|----|----|----|----|----|----|
| 502.3 | 0  | 0  | 0  | 0  | 0  | 0  | 1  | 0  | 1  | 0  | 0  | 0  | 0  | 0  | 0  | 0  | 0  | 0  | 0  | 0  | 0  | 1  |
| 502.9 | 0  | 0  | 0  | 1  | 0  | 0  | 1  | 0  | 1  | 0  | 0  | 0  | 0  | 0  | 0  | 0  | 0  | 0  | 0  | 0  | 0  | 1  |
| 502.4 | 0  | 0  | 0  | 1  | 1  | 0  | 0  | 0  | 0  | 0  | 0  | 0  | 0  | 0  | 0  | 0  | 0  | 0  | 0  | 1  | 0  | 0  |
| 502.6 | 0  | 0  | 0  | 1  | 0  | 0  | 0  | 0  | 0  | 0  | 0  | 0  | 0  | 0  | 0  | 0  | 0  | 1  | 1  | 0  | 0  | 0  |

Fig. 5D

| Address Line 1 |
|---|
| 639 N MILLS AVENUE |
| 306 W MAIN STR,CUMMING, GA 30130 |
| 3142 WEST CENTRAL AV |
| 843 HEARD AVE |
| 1139 GREENE ST   ACCT#1234 |
| 4275 OWENS ROAD SUITE 536 EVANS |

Fig. 6A

| Address1 |
|---|
| J-181 SAKET, NORTH AVE |
| C-001,EAST WOODS APT, KONDAPUR, PLOT NO.E/81, RH SECTOR 12, PANVEL HOUSE NO 772, GROUP-III,DDA JANTA FLT |
| 223 MG ROAD, KAROL BAGH |
| 412 PARK LANE ROAD,TOLLIGUNJ |

Fig. 6B

COMPUTING THE NEED FOR STANDARDIZATION OF A SET OF VALUES

TECHNICAL FIELD

The present invention relates generally to digital computer systems, and more particularly to determining a data standardization score for an attribute of a dataset.

BACKGROUND

Data quality improvement is achieved through data cleansing which typically has four stages namely, investigate, standardize, de-duplication, and survivorship. In the standardization, stage data is transformed to a standard uniform format. This involves segmenting the data, canonicalization, correcting spelling errors, enrichment, and other cleansing tasks using rule sets. Different rule sets need to be created for data from different domains. However, creation of data standardization rules is an expensive task and can easily take months of effort if not weeks. Thus, there is a need to control the creation of the data standardization rules.

SUMMARY

In one embodiment of the present invention, a method for determining a data standardization score for an attribute of a dataset comprises providing attribute metadata descriptive of the attribute. The method further comprises providing a data standardization score algorithm for finding potential duplicates in attribute values and calculating a data standardization score accordingly, the calculated data standardization score reflecting whether data quality of attribute values would increase if a standardization rule is applied to the attribute values. The method additionally comprises determining, based on the metadata for the attribute, whether an indication to carry or not to carry out standardization is available for at least part of attribute values of the dataset. Furthermore, the method comprises setting a respective value for the data standardization score in response to finding the indication. Additionally, the method comprises running the data standardization score algorithm on the at least part of attribute values of the dataset in response to not finding the indication. In addition, the method comprises comparing, by a processor, the data standardization score value to a predefined criterion to determine whether data standardization is to be applied on the attribute.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIGS. 5A-5D are diagrams depicting a method for creating clusters of attribute values at various stages of processing using a bitmap in accordance with an embodiment of the present invention; and FIGS. 6A-6B depict an example format in which information may be presented in accordance with an embodiment of the present invention.

DETAILED DESCRIPTION

Figure 1:
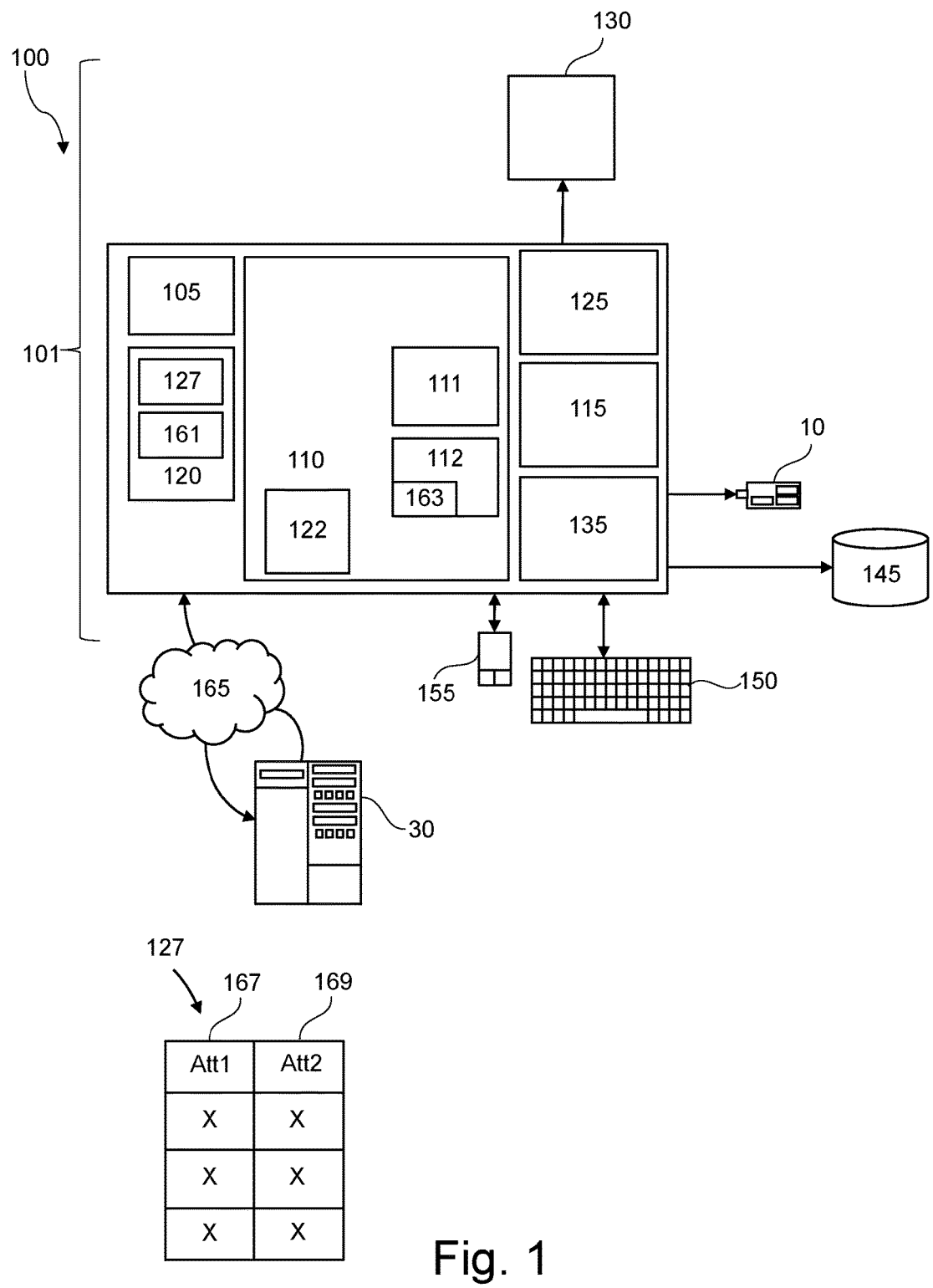
FIG. 1 represents a computerized system, suited for implementing one or more method steps as involved in the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The standardization refers to a process of transforming data to a predefined data format. The data format may include a common data definition, format, representation and structure. The data that is to be transformed is the data that is not to conform to the predefined data format. For example, the process of transforming the data may comprise processing the data to automatically transform the data where necessary to comply with those common representations that define the data format. This process of transforming data may include identifying and correcting invalid values, standardizing spelling formats and abbreviations, and validating the format and content of the data.

The present method may identify potential duplicates, wherein two values are potential duplicates if the two values are identical duplicates or the two values are not identical yet but they may represent the same entity. For example, the two values may be duplicates (e.g., represent the sane entity or the same attribute value) but may have spelling errors and/or may have a respective order of their constituent parts which is different. For example, the two values "Toyota Camery" and "Camry Toyota".

Rather than depending on good feeling or experience in other domains, the present method provides data scientists with a metric to identify whether standardization is required for a particular column. This metric may become more important if the end user is a non-technical or in some cases another software program. The present method may be particularly advantageous for big data as the generation of metrics may be scalable for large volumes.

For example, during data profiling, a score may be generated for each column that will indicate how "dirty" the column is in terms of standardization. In another words, a metric is generated that will indicate the confidence that the quality of data would improve if a standardization process would be applied on them.

In absence of such a method a data scientist would look at sample data, identify manually columns that could benefit from standardization and test available standardization rules. The present method may automatically generate a score to gauge the need for standardizing a particular column of data. The present method may scale in a big data environment or in a data reservoir.

According to one embodiment, the attribute values are all attribute values of the attribute in the dataset. This may be advantageous as it may enable an accurate scoring method based on the full dataset. This is in contrast to a method using a sample of the dataset, where the results may not be reliable.

According to one embodiment, the method further comprises providing a set of criterions. The determining, based on the metadata for the attribute, whether an indication to carry or not to carry out standardization is available comprises: checking each of the criterions for the values of the attribute. This embodiment may prevent creation and running of standardization score algorithm when other conditions can be easily checked for deciding to do or not to do the standardization. The creation and running of standardization score algorithm may be very expensive in term or processing resources compared to the checking of the set of criterions based on metadata.

According to one embodiment, the set of criterions comprises one or more of: the attribute values are resulting from a data standardization algorithm, the attribute representing a primary (PK) or foreign key (FK) of the dataset, the attribute values have a predefined data class, the attribute does not have similar characteristics as another attribute of the dataset, wherein values of the other attribute are standardized, the number of different formats of the attribute is lower than a number of formats threshold, the average length of the values of the attribute is lower than a length threshold, the average number of words of the attribute is lower than a number of words threshold, the fraction of the distinct values of the attribute is lower than fraction threshold. This embodiment may provide as much conditions as possible that may eradicate the need for the column to be considered for data standardization and the need for data standardization can return a very low number.

According to one embodiment, the method is performed during data profiling of the dataset. For example, the metadata may further comprise the profiling results that may be obtained while performing the data profiling e.g., the method may be performed as soon as the profiling results are available and before performing ETL processes. This may be advantageous as the metadata may further include the data providing results that result from profiling the dataset. The profiling results in addition to the metadata may provide an enriched source of information on the columns such that the probability of fulfilling the conditions described above may be increased compared to a reduced source of information. Thus, this may further reduce the number of times the standardization score algorithm is executed. The need of standardization may be a potential data quality problem that needs to be resolved as earlier as possible in an event involving ETL processes e.g. at the data profiling stage before integrating the data. This earlier standardization may provide a clean data warehouse sample that can be used for performing an accurate data analysis.

According to one embodiment, the standardization score algorithm comprises an algorithm for calculating similarity between attribute values and calculating the score based on the similarities. For example, the attribute values may be of string type. The attribute values of the dataset may be distinct values that are determined by (or are the output of) a given deduplication algorithm. However, since such deduplication algorithms are incapable of finding potential duplicates efficiently, using the standardization score algorithm may overcome that issue by finding potential duplicates in a time efficient manner.

According to one embodiment, the standardization score algorithm is configured for: converting each attribute value (the attribute value being a string) to a respective set of bigrams; determining all bigrams present in the attribute values; representing bigrams present in the attribute values as bits (or binary numbers), resulting in a bitmap representing the presence of bigrams in the attribute values; grouping attribute values using bitwise operations on the bitmap, wherein each group comprises attribute values that are determined based on pairwise bigram-based similarity scores, the pairwise bigram-based similarity score reflecting the number of common bigrams between two attribute values; calculating the data standardization score using the number of groups. The pairwise bigram-based similarity score may be determined for each pair of attribute values. The pairwise bigram-based similarity score of a pair may for example comprise the number of common bigrams between the attribute values of the pair. A pair of attribute values may be included in a group if the pairwise bigram-based similarity score is higher than a predefined score threshold. For example, the score threshold may be a predefined minimum number of common bigrams.

According to one embodiment, the grouping of attribute values comprising: selecting a first bit position in the bit map and checking which set of attribute values have the bigram corresponding to the first bit position; grouping attribute values having the bigram corresponding to the first bit position in one or more groups, wherein each group comprises attribute values of the set of attribute values that are determined based on pairwise bigram-based similarity scores, the pairwise bigram-based similarity score reflecting how many bigrams two attribute values have in common; in case the number of groups identified is smaller than a predefined threshold, repeating the selecting and grouping steps using a second bit position and non-clustered attribute values until the number of groups is higher than the predefined threshold or until all bits are processed or until all attribute values are grouped; calculating the data standardization score using the number of groups. The standardization score algorithm may further be configured for removing duplicates from data that are identified e.g. in the profiling process.

This may be advantageous as it may find in a long list of values, group of values that are likely to be a different spelling of the same value. This embodiment works at the values level and allows one to identify the 2 single values which are (strictly speaking) different strings (e.g., different spellings of the same value). This is by contrast to conventional methods that cannot detect that 2 values having similar words in a different order are likely to be the same: ex: Rob Alice vs. Alice Robert.

This embodiment may efficiently cluster the similar data together and also efficiently compare them to find potential duplicates within them without the knowledge of the domain of the data.

This may provide an efficient method for finding potential duplicate values, in particular in large set of unclassified data.

Other advantages of this embodiment may be the following advantages:

Comparing bits is much faster than comparing strings. So this may make the algorithm much more scalable.

The present method may not need prior sorting of the data before comparison which most of the matching algorithms do. Sorting a huge dataset is a time consuming overhead that was avoided.

The present method may not need to do classification or standardization of the data to find potential duplicates.

There is a formula to generate a matching threshold while comparing the bits of two attribute values. The formula as described below is the following (S1∩S2)/(S1US2) (the ratio of (S1∩S2) and (S1US2)) where S1 are the bits that are set to 1 a first attribute value and S2 are the bits that are set to 1 for a second attribute value.

Converting the data to phonetic (like Metaphone) during preprocessing may reduce drastically the number of bigrams generated and thus make the clustering much faster. The more stricter algorithms, post clustering can very well make up for some of the false positives that could have been generated due to this liberality.

This method may particularly be advantageous to find existence of duplicates in the cleansed Master Data.

For example, if there is a spelling mistake in a bigram then the present method may be able to cluster it together such as for example words PARIS and PAERIS. However, the present method may not group together the terms PARIS and ARIZONA even of presence of the bigram AR, because the present method may take care of this by doing left shift multiple times. So if PARIS and PAERIS do not match in first Bigram comparison, it may get another chance.

According to one embodiment, the grouping of the attribute values comprising: performing a bitwise operation for each pair of attributes values of the attribute values for determining the number of common bigrams between the pair of attribute values, recursively building each group by including a first pair of attribute values in the group and including each further pair of attribute values that shares at least one attribute value with previously included pairs of the group. For example, if val1 is linked to val2 to form the first pair, then put recursively val1, val2 and all values which are directly or indirectly linked to val1 or val2 in the same group. For example, if there are pairs like (val1, val2), (val2, val3) and (val3, val6), the first pair (val1, val2) may be included in the group, and since val2 is linked to val3 in the second pair, the second pair may also be included in the group (e.g., only val3 will be added to the group because val2 already included in the group and no need to duplicate it), then it may be determined that val6 is linked to val3 in the third pair, and thus the third pair may also be included in the group (e.g., only val6 will be added to the group because val3 already included in the group and no need to duplicate it) and the same may be done for other groups.

According to one embodiment, the method further comprises: removing from the bitmap bigrams which are present in all attribute values. This embodiment may reduce the size of the bitmap by rejecting bigrams that may not be useful for the potential duplicates identification. And may thus reduce the processing resources required for processing the bitmap.

According to one embodiment, the method further comprises: for each group of attribute values of the groups that result from the grouping step:

For each pair of attribute values of the group:
splitting a first attribute value of the pair into first words and a second attribute value of the pair into second words, the first words being constituent parts of the first attribute value, the second words being constituent parts of the second attribute value;
determining all bigrams present in each first and second words;
determining pairs of first and second words having a number of common bigrams higher than a predefined threshold;
determining a word level character-based similarity score for each determined pair of words;
combining the determined word level character-based similarity scores to determine a character-based similarity score for the pair;
selecting the pairs of attribute values whose character-based similarity score is higher than a predefined similarity threshold;
clustering pairs of the selected pairs that share one attribute value into a respective cluster, thereby resulting in one or more clusters. (e.g., the clustering of the pairs may be performed recursively as described herein).

For example, the first (second) words may be words that are separated by a separator, such as a space or coma, etc. This embodiment may further increase the accuracy of the present method for identification of the potential duplicates.

According to one embodiment, the pairwise bigram-based similarity score is determined only for pairs of attribute values having a difference in length that is smaller than a predefined maximum difference. For example, the two attribute values of the pair may have similar or the same length in order to be compared. This may be advantageous as the attribute values (e.g., strings) may be broken in groups based on size so that only similar sized strings may be compared. This may not group strings like "Paris" and "Arizona tourist office center" together because of size even though they have same bigram "ar". Lengths could be overlapping (0-15/10-25/20-35/ . . . ). This may save processing time that would otherwise be required by comparing those different strings.

According to one embodiment, the pairwise bigram-based similarity score being determined using the number of bit pairs having same bits that two attribute values have. For example, the pairwise bigram-based similarity score may be the ration of the determined number of bit pairs divided by the number of bit pairs that have different bits of the two attribute values. This may provide an accurate scoring method based on accurately identified duplicates.

According to one embodiment, for each group of attribute values: determining for each pair of attribute values a character-based similarity score using a similarity algorithm; selecting the pairs of attribute values whose character-based similarity score is higher than a predefined similarity threshold; clustering pairs of the selected pairs that share one attribute value into a respective cluster, thereby resulting in one or more clusters. Using further similarity check algorithm on top of the standardization score algorithm may further increase the accuracy of the present method and may provide cleansed groups. Thus, the resulting score may be more accurate.

According to one embodiment, the determining of the character-based similarity score for the each pair comprising: comparing each word of a first attribute value of the each pair with each word of a second attribute value of the each pair. For example, for each comparison a word-level character-based similarity score may be determined or calculated and the character-based similarity score for the each pair may be a combination (e.g., the sum) of the word-level character-based similarity scores.

According to one embodiment, calculating the data standardization score using the number of groups comprises:

determining the number of attribute values that are comprised in the clusters, wherein the data standardization score is the ratio of the determined attribute values to the number of attribute values in the dataset. This may provide a reliable estimation of the score in particular for large datasets. This is by contrast to a scoring based on absolute number of duplicates that are found.

According to one embodiment, the similarity algorithm comprises at least one of edit distance and Levenshtein edit distance algorithms. This embodiment may be advantageous as it may seamlessly be integrated with existing systems.

According to one embodiment, the length of the bitmap is determined by the number of different bigrams occurring at least once in the dataset. This may provide reliable decomposition of the attribute values in order to find duplicates. This is by contrast to determining the length of the bigram as the total number of theoretical possible bigrams.

According to one embodiment, the bigram is a sequence of two or more adjacent elements or characters of the attribute value. The present method may be applied using N-grams as described herein with the 2-grams, wherein the N-gram is a sequence of N adjacent characters of an attribute value.

According to one embodiment, representing bigrams present in the attribute values as binary numbers further comprises removing from the bitmap all columns of bits where the value of the bit is the same for all rows of the bitmap. This may speed up the processing of the present method.

According to one embodiment, the attribute is a string type.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 (e.g., instructions to manage databases, such as a database management system). The memory 110 may further comprise a query optimizer. The query optimizer may comprise instructions (e.g., software instructions that when executed may provide a query execution plan for executing a given query).

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Software 112 may, for example, comprise a data standardization score algorithm 163 for finding potential duplicates in attribute values of a dataset. The data standardization score algorithm 163 may be configured for calculating a data standardization score according to the potential duplicates found. The calculated data standardization score reflects whether data quality of attribute values would increase if a standardization rule is applied to the attribute values.

In exemplary embodiments, a conventional keyboard 150 and mouse 155 can be coupled to the input/output controller 135. Other output devices such as the I/O devices 145 may include input devices, for example, but not limited to, a printer, a scanner, microphone, and the like. Finally, the I/O devices 10, 145 may further include devices that communicate both inputs and outputs, for instance, but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise at least one dataset (or data table) 127. For example, the software 112 may receive (automatically or upon request) as input the dataset 127, or may download the dataset 127 from storage 120 or memory 110.

The dataset 127 may comprise one or more columns (e.g., 167-169), wherein each column is represented by a respective attribute "Att1" and "Att2". The rows or records of the dataset 127 may comprise values of the attributes (attributes and columns are used interchangeably). The attributes 167-169 may for example be a string type value.

The term "dataset" or data table as used herein refers to a collection of data that may be presented in tabular form. Each column in the data table may represent a particular variable or attribute. Each row in the data table may represent a given member, record or entry of the data table. In another example, the dataset may have a hierarchical structure like JSON or XML format. In another example, the dataset may be represented as a graph, or may be represented in a triplet format like RDD or may have a structured format that may be accessed and used in accordance with the present method.

The one or more attributes 167-169 may be described using metadata 161 that may for example be stored in storage 120.

Figure 2:
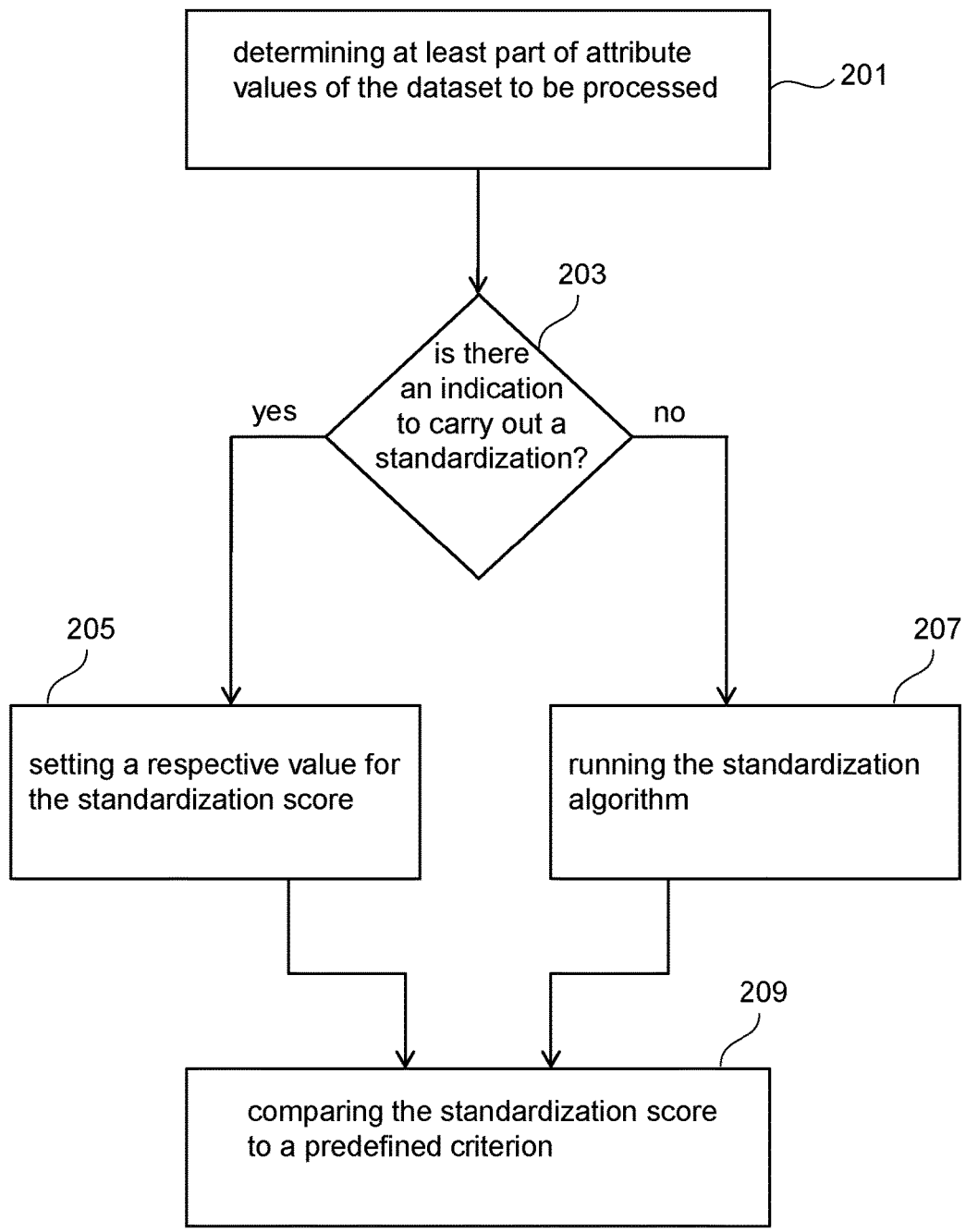
FIG. 2 is a flowchart of a method for determining a data standardization score for an attribute of a dataset in accordance with an embodiment of the present invention.

FIG. 2 is a flowchart of a method for determining a data standardization score for an attribute 167 of a dataset 127. For example, the present method may be applied on each attribute of the dataset 127. In another example, the present method may be applied for an attribute 167 of the dataset 127, wherein the attribute 167 is for example user defined. In another example, the attribute 167 to be processed may automatically be chosen (e.g., randomly chosen).

In step 201, at least part of attribute values of the attribute 167 of the dataset 127 may be determined or defined in order to be processed in accordance with the present method. For example, the at least part of attribute values of the attribute of the dataset 127 may be user defined (e.g., a user input may be received indicating that at least part of attribute values of the attribute of the dataset 127). In another example, the at least part of attribute values of the attribute of the dataset 127 may be randomly selected or sampled from the dataset 127 (e.g., a predefined number of records or rows of the dataset 127 may be selected from the dataset 127). The at least part of attribute values of the attribute 167 of the dataset 127 may be received (e.g., from a user or may automatically be accessed e.g. as soon as stored on the storage 120). The term "user" may refer to an entity e.g., an individual, a computer, or an application executing on a computer.

In another example, all attribute values of the attribute of the dataset 127 may be processed. This may enable an accurate scoring of the attribute compared to a score based on a sample of the dataset 127.

In one example, the attribute values of the attribute 167 that are in the dataset 127 may be the results of a deduplication algorithm that is applied on the values of the attribute 167 (e.g., the attribute values of the attribute 167 are distinct values). The deduplication algorithm may be configured to remove duplicates from the dataset 127 based on values of the attribute 167. This may be advantageous as it may speed up the present method as it may run on a clean sample. Although two values may be classified as distinct values by the deduplication algorithm, the two values may not be "true" distinct values. For example, the two values may be duplicates but may have spelling errors or may have an order in their constituent parts which is different and thus the deduplication algorithm may not detect them. The two values may be identified as duplicates or potential duplicates by the present method as described herein.

The metadata 161 for the attribute 167 may be used to determine whether (inquiry 203) an indication to carry or not to carry out standardization is available for the at least part of attribute values of the attribute 167 of the dataset 127.

The metadata 161 of the attribute 167 may for example comprise or stores values of parameters or variables that describe the attribute 167. For example, the metadata 161 may comprise a Boolean that indicates whether this column or attribute 167 can be null; the type of the attribute 167; Boolean indicating whether this column or attribute 167 is a primary key. The metadata 161 may further contain the data class of the attribute 167, references to external terms or tags linked to the attribute 167, information indicating where the values of the attribute 167 come from (e.g., data lineage information), indication if a standardization or cleansing already occurred on the values of the attributes 167 before being stored in the dataset 127 and statistical information on the values of the attribute 167 and their characteristics.

For example, the metadata 161 may be read to verify one or more predefined conditions or criteria on the attribute values of the attribute 167 (e.g., that are to be satisfied by the attribute values of the attribute 167 in order to carry the standardization). For example, each condition of the predefined conditions indicates the behavior of the attribute values that would (clearly) indicate to carry or not to carry out standardization for the attribute 167.

A condition or criteria of the multiple conditions may be an expression that may for example be created using an operator. The expression may form a so-called relational expression or a condition. The expression may consist of a data item (which may for example be one of the variables or parameters of the metadata 161), an operator or negation operator, and a value. The term "operator," as used herein, refers to an operator that tests values or range of values against a data item. The operator may for example comprise a relational operator that tests or defines a relation or condition between two entities including. These may include equality (e.g., isPKcolumn=True) where isPKcolum is one of the variables of the metadata 161.

Figure 4:
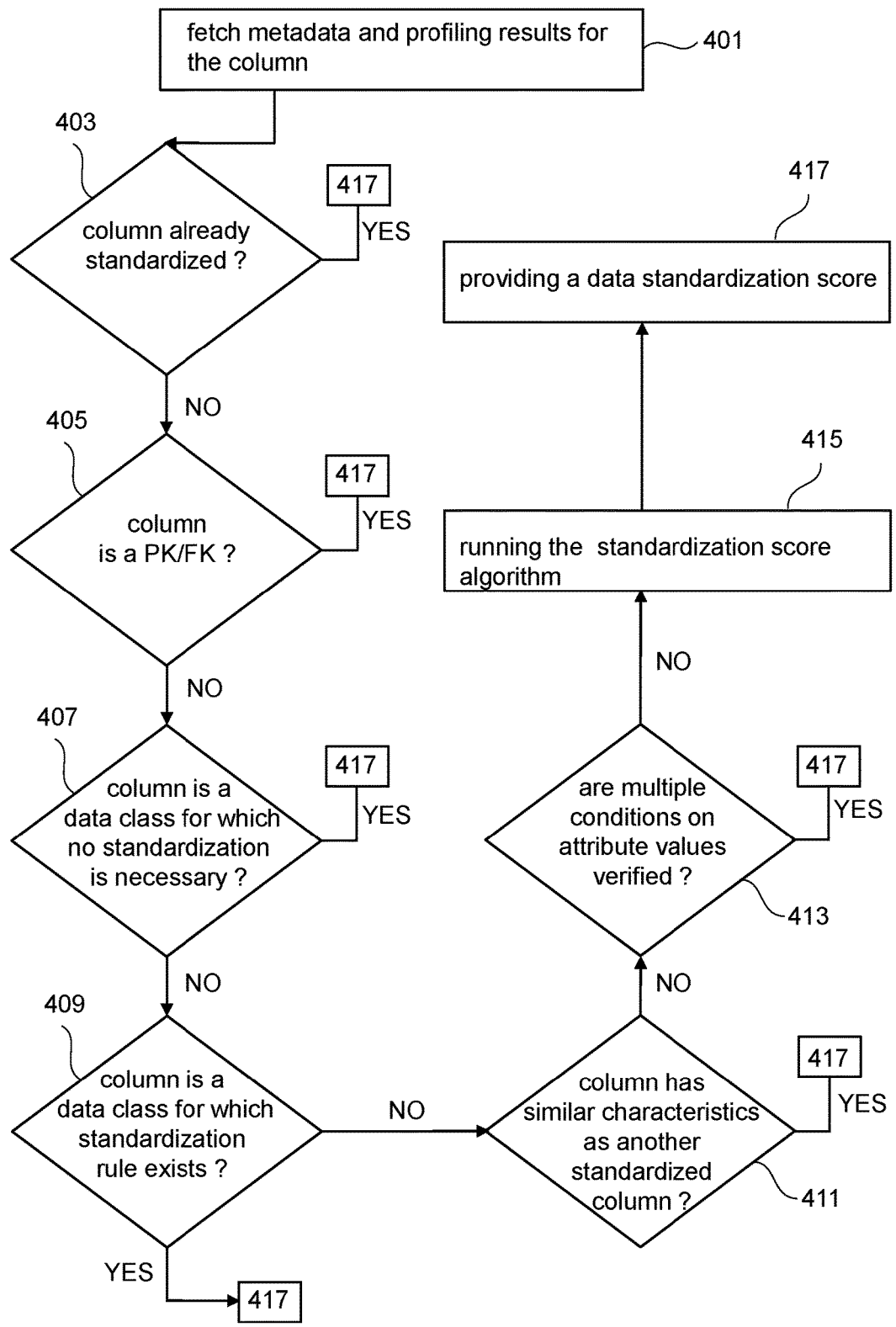
FIG. 4 is a flowchart of a method for determining whether an indication to carry or not to carry out standardization is available in accordance with an embodiment of the present invention.

In one example, a condition of the predefined conditions may check if the attribute 167 represents a PK or FK column. If the attribute 167 represents a PK or FK column then this is an indication to not carry out standardization for the attribute 167. This is because columns or attributes that are part of a PK/FK relationships are no candidate for standardization due to the fact that they are building a good PK/FK relationship indicates that they are already in the expected format. Defined PK/FK relationships and candidate relationships can be retrieved from a metadata catalogue that comprises the metadata or from the data profiling results of the attribute 167. FIG. 4 provides further details on the predefined conditions.

In another example, the metadata of the attribute 167 may comprise the indication to carry or not to carry out standardization e.g. in a form of a flag that is set to a value that indicates to carry or not to carry out standardization for the attribute 167.

In response to finding the indication, a respective value may be set in step 205 for the data standardization score. For example, the data standardization score may be set to value 1.

In response to not finding the indication, the data standardization score algorithm 163 may be run in step 207 on the at least part of attribute values of the dataset, which may result in the standardization score.

In case of multiple predefined conditions (e.g., two conditions: cond1, cond2), the indication may be verified for each condition (e.g., sequentially) and only if all conditions are not verified then step 207 may be performed. For example, if cond1 is not verified in that the standardization may not be performed based on the result of verification of cond1, the second condition, cond2, may be verified and only if also the second condition, cond2, is not verified in that the standardization may not be performed based on the result of verification of cond2 then the data standardization score algorithm 163 may be run.

In another example, a condition (e.g., cond2) may be the combination of multiple conditions (e.g., subcond1, subcond2). In this case, if at least one of the sub-conditions, subcond1 and subcond2, is not verified, then the whole condition, cond2, is not verified. And if all sub-conditions, subcond1 and subcond2, are verified, then the whole condition, cond2, is verified.

The standardization score that is calculated by the data standardization score algorithm 163 may depend on the number duplicates in attribute values of the attribute 167. For example, the data standardization score may be the ratio of the duplicate attribute values of the attribute 167 to the number of attribute values of the attribute 167 in the dataset 127.

In step 209, the data standardization score value may be compared to a predefined criterion to determine whether data standardization is to be applied on the attribute 167. For example, if the predefined criterion is fulfilled then the data standardization may be applied on all values of the attribute 167 of the dataset 127; otherwise the data standardization may not be applied on the attribute 167 in the dataset 127. The predefined criterion may comprise: the data standardization score value is higher than a threshold (e.g., 0.6).

The method of FIG. 2 may be performed during the data profiling stage of the dataset 127, wherein the metadata 161 may further comprise profiling results of the dataset 127 which may be used in inquiry 203. The data profiling may indicate which records of the dataset 127 are potentially interesting for performing the present method (e.g., indicating records interesting for performing inquiry 203). The data profiling may further analyze the data to retrieve information for each analyzed columns, such as their inferred types, general statistics about the values it contains, common formats, value distributions, etc.

Figure 3:
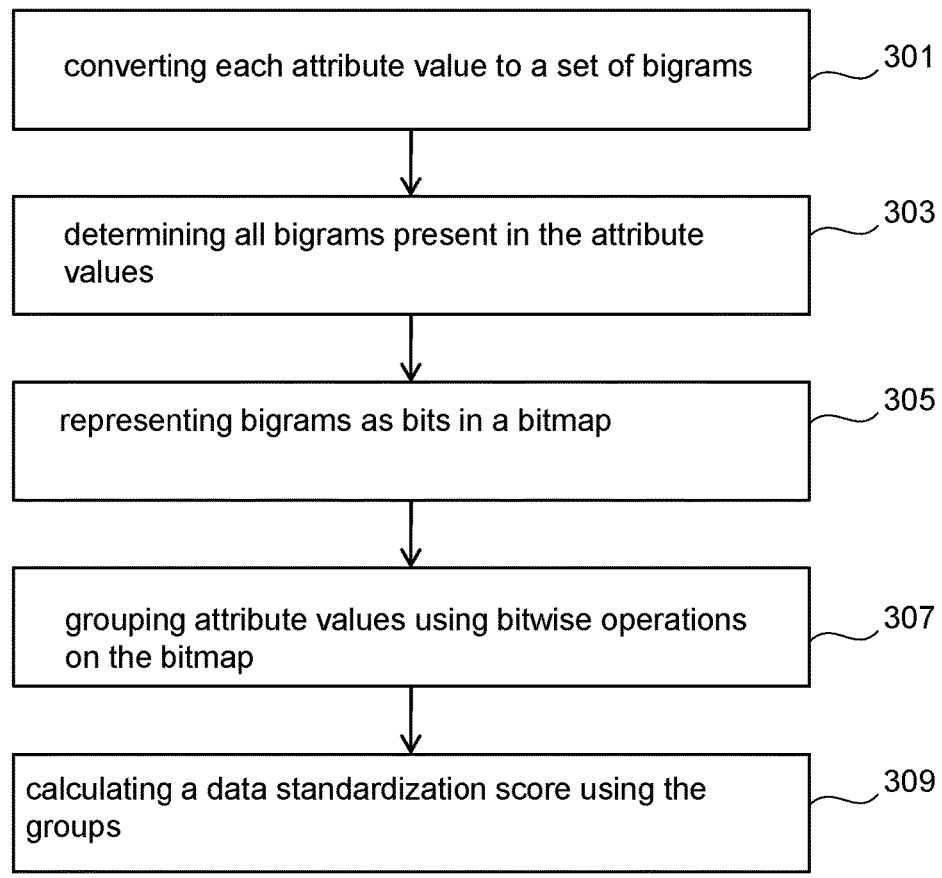
FIG. 3 is a flowchart of a method for finding groups of potential duplicates using a standardization scoring algorithm in accordance with an embodiment of the present invention.

FIG. 3 is a flowchart of a method for finding groups of potential duplicates, which is performed by the scoring the standardization algorithm 163.

In step 301, each attribute value of the at least part of attribute values of the attribute 167 of the dataset 127 may be converted to a respective set of bigrams. The bigrams may for example comprise a sequence of two adjacent elements of the attribute value. For example, if the attribute value is "PATENT", then the set of bigrams of the attribute value "PATENT" is "PA", "AT", "TE", "EN" and "NT".

In step 303, all bigrams present in the attribute values of the attribute 167 may be determined. For example, all bigrams may be stored in an array where each element of the array may comprise a bigram and an indication of the corresponding attribute value in the dataset 127.

In step 305, bigrams (e.g., as determined in step 303) present in the attribute values may be represented as binary numbers. This may result in a bitmap representing the presence of bigrams in the attribute values. The bitmap or bit array may be an array data structure that compactly stores bits.

The bitmap refers to a bit array (e.g., a two dimensional bit array) in which each set of bits, represents or corresponds to an item (e.g., an attribute value). For example, the bitmap may comprise a bit matrix to store two dimensional arrays of 0 or 1 values. The bitmap may comprise m rows and n columns, where m refers to the number of attribute values and n refers to the number of bigrams. Each row in the bitmap may represent a given attribute value (the row comprises the set of bits that corresponds to the given attribute value) and each column in the bitmap may represent a bigram. Each cell of the bitmap has a value of 0 or 1. The value 0 (1) indicates that the attribute value that corresponds to the cell does not comprise (does comprise) the bigram that corresponds to the cell. A 0 or 1 value in the bit matrix uses 1 bit. This data structure may have the advantage of reducing the memory usage compared to a normal data structure.

In order to access the bitmap, the present method may provide and/or use predefined information indicating which bigram corresponds to which position in the bitmap (ex: bigram aa corresponds to the 1st bit, bigram ab, the second, etc.) and/or which attribute value corresponds to which position in the bitmap.

For example, the bitmap may be created in step 305 and defined such that each column of bits of the bitmap represents a respective bigram that has been found or determined for one or more attribute values of the attribute 167. The column of bits comprises bits that are sets for each attribute value of the attribute 167. The bitmap comprises a set of bits for each of the attribute values to be processed. The set of bits comprises a number of bits that corresponds to the number of bigrams in all the attribute values to be processed (e.g., each bit in a set of bits corresponds to a respective bigram).

For exemplification purpose, assuming that attribute values to be processed are "PATENT", "ATE", "APTENT", the list of bigrams may comprise "PA", "AT", "TE", "EN", "NT", "AP" and "PT" the bitmap may have the following structure:

|   | TE | AT | PA | EN | NT | AP | PT |
|---|----|----|----|----|----|----|----|
| 1 | 1  | 1  | 1  | 1  | 1  | 0  | 0  |
| 2 | 1  | 1  | 0  | 0  | 0  | 0  | 0  |
| 3 | 1  | 0  | 0  | 1  | 1  | 1  | 1  |

The first row indicates the bits that are associated with the attribute value "PATENT". The bits of the first row are set such that they represent the content of the attribute value "PATENT". Since the attribute value "PATENT" has the bigrams "PA", "AT", "TE", "EN" and "NT", the corresponding bits are set to 1, while the remaining bits that correspond to the other bigrams "AP" and "PT" are set to 0 since none of them is contained in the attribute value "PATENT".

The second row indicates the bits that are associated with the attribute value "ATE". The bits of the second row are set such that they represent the content of the attribute value "ATE". Since the attribute value "ATE" has the bigrams "AT" and "TE", the corresponding bits are set to 1, while the remaining bits that correspond to the other bigrams "PA", "EN", "NT", "AP" and "PT" are set to 0 since none of them is contained in the attribute value "ATE".

The third row indicates the bits that are associated with the attribute value "APTENT". The bits of the third row are set such that they represent the content of the attribute value "APTENT". Since the attribute value "APTENT" has the bigrams, "TE", "EN", "NT", "AP" and "PT" the corresponding bits are set to 1, while the remaining bits that correspond to the other bigrams "PA" and "AT" are set to 0 since none of them is contained in the attribute value "APTENT".

In step 307, the attribute values may be grouped, which may result in a given number of groups. Each group of the resulting groups may comprise attribute values that have a number of common bigrams that is higher than a predefined minimum number of common bigrams. The grouping may be performed using bitwise operations of sets of bits of pairs of the attribute values to be processed.

Using the above example, among the attribute values "PATENT", "ATE" and "APTENT" groups may be built. For that, three pairs of attribute values may be considered namely: a first pair ("PATENT", "ATE"), second pair ("PATENT", "APTENT") and third pair ("APTENT", "ATE").

For the first pair the bigrams that are in common are "TE" and "AT" which is a number of 2 common bigrams between attribute values "PATENT" and "ATE".

For the second pair the bigrams that are in common are "TE", "EN" and "NT" which is a number of 3 common bigrams between attribute values "PATENT" and "APTENT".

For the third pair there is only one bigram "TE" that is in common between attribute values "APTENT" and "ATE".

In order to determine the number of bigrams (bits) which are present in both attribute values of a pair, an AND bitwise operation between the 2 sets of bits of the pair may be performed. In another example, the number of bigrams which are either present in both or absent in both sets of bits of the pair may be counted using an NOT XOR bitwise operation may be used for defining the pairwise bigram-based similarity score. In another example, bitwise operations may be used to calculate the following similarity between two attribute values A and B: similarity(A, B)=nb_bits_set(A AND B)/nb_bits_set(A OR B). Where bitwise operation nb_bits_set(A AND B) counts the number of bits set to 1 in both attribute values A and B and bitwise operation nb_bits_set(A OR B) counts the number of bits set to 1 in at least one attribute value A and B. A further example is shown with reference to FIGS. 5A-5D.

For example counting the common number of bits between 2 sets of bits may be performed by applying an AND operation between the 2 sets of bits and counting the number of bits that are set to 1 in the result. These operations may be done very efficiently by a CPU. This common number of bits between two sets of bits may be indicative of the number of common bigrams between the two sets of bits.

For example, for the first pair, the NAND result between set of bits of "PATENT" and set of bits of "ATE" is 1100000 which indicates that 2 pairs of bits have same values 1 in the first pair (or two bigrams are present in both attribute values of the first pair).

For the second pair, the AND result between set of bits of "PATENT" and set of bits of "APTENT" is 1001100 which indicates that 3 pairs of bits have same values 1 in the second pair.

For the third pair, the AND result between set of bits of "ATE" and set of bits of "APTENT" is 10000000 which indicates that 1 pair of bits have same values in the third pair.

In order to build a group of attribute values, a pairwise bigram-based similarity score may be determined for each of the three pairs. The pairwise bigram-based similarity score may for example equal to the ration of the common bigrams for a given pair over all bigrams (e.g., that are found in step 303). In this case, the first, second and third pairs may have the bigram-based similarity score of 2/7, 3/7 and 1/7 respectively.

The calculated bigram-based similarity scores may be compared with a predefined threshold e.g. 0.25 to check whether they are higher than 0.25. In this case, the first and second pairs would service the condition and may then be grouped in one group since they share one attribute value "PATENT". The one group may comprise the attribute values "PATENT", "APTENT" and "ATE".

However, if the predefined threshold is 0.35, then only the second pair would service the condition and may then be used to build or define one group comprising the attribute values "PATENT" and "APTENT".

In step 309, the data standardization score may be calculated using the groups. For example, the data standardization score may be defined as the ratio of the determined attribute values to the number of attribute values in the dataset. Using the above example (with threshold 0.25), this ratio is 1 meaning that 100% of the attribute values of the dataset are grouped. By comparing this data standardization score to a score threshold it may be decided whether or not to standardize the attribute values. Using the above example, if the score threshold is 30% then the attribute values PATENT", "APTENT" and "ATE" may be standardized.

Before performing step 309, the groups defined in step 307 may further be processed for checking or running on them other similarity algorithms. For example, the group comprising attribute values PATENT", "APTENT" and "ATE" may further be processed by calculating for the first, second and third pairs a respective character-based similarity score using a similarity algorithm. The similarity algorithm may be at least one of edit distance and Levenshtein edit distance algorithms. If for example the character-based similarity score for the first and third pairs are below a given character scoring threshold, then the group may be redefined such that the attribute value "ATE" is excluded from the group of attribute values PATENT", "APTENT" and "ATE". The resulting group may comprise only PATENT" and "APTENT".

FIG. 4 is a flowchart of a method for determining, based on the metadata 161 for the attribute 167, whether an indication to carry or not to carry out standardization is available for attribute values of the dataset (further detailing inquiry 203).

In step 401, metadata 161 and profiling results of the attribute or column 167 may be fetched.

In inquiry 403, it may be determined if column 167 is already standardized (in other words the column 167 is a result of data standardization). Data columns that are themselves result from data standardization process can be ignored from standardization process. The column names could be found in standardization dictionaries (e.g. that is part of the metadata 161) and the column with those names could be ignored. 0.0 can be returned for these. Thus, if column 167 is already standardized step 417 may be performed; otherwise inquiry 405 may be performed. In step 417 the score may be set to value 0 (e.g. value of 0 is to indicate that no standardization is needed). In another example, column 167 may be considered as already standardized if column 167 has been indirectly standardized. That is, column 167 is the result of an ETL process that is applied on source data that is a standardized data. For that, the data lineage information may be used to follow the data to their source and check if it has already been standardized.

In inquiry 405, it may be determined if column 167 is a Primary Key or Foreign Key (e.g. either because column 167 is inferred as a good PK/FK or because it is part of an actual PK/FK relationship). Columns that are part of a PK/FK relationships are no candidate for standardization because the fact that they are building a good PK/FK relationship indicates that they are already in the expected format. Defined PK/FK relationships and candidate relationships can be retrieved from the metadata 161 or the data profiling results that may be part of the metadata 161. Thus, if column 167 is a Primary Key or Foreign Key step 417 may be performed; otherwise inquiry 407 may be performed. In step 417 the score may be set to value 0.

In inquiry 407, it may be determined if column 167 is classified as a data class for which no standardization is known to be necessary. Data profiling tools can classify the kind of data contained in a column. For example, Product Image, Identifier Columns (say True or False flags) do not require data standardization. So if the column contains these data class, they can be ignored from the perspective of data Standardization. 0.0 can be returned as the score. Thus, if column 167 is classified as that data class, step 417 may be performed; otherwise inquiry 409 may be performed. In step 417 the score may be set to value 0.

In inquiry 409, it may be determined if column 167 is classified as a data class for which a standardization rule exists. If the detected data class of a column is known to have standardization rules applicable for it, return 1.0 as it is known that it can be standardized. Thus, if column 167 is classified as that data class step 417 may be performed; otherwise inquiry 411 may be performed. In step 417 the score may be set to value 1.

In inquiry 411, it may be determined if column 167 has similar characteristics (e.g. domain fingerprint) or common values with another column of the dataset 127 which has been standardized before. If the analyzed column contains data showing the same characteristics as another column which has been standardized before (although the exact classification of the column could not be determined), the need for standardization is the confidence that the 2 columns represent the same domain. For instance if it is known that standardization was applicable for the data in FIG. 6A, and the data of FIG. 6B seem to contain information of same type, then the need for standardization of the data of FIG. 6B is the confidence that those two columns represent information of same type. Computation of fingerprints allowing to test whether 2 sets of values share enough characteristics to indicate that they are likely to be of same domain may be used. Thus, if column 167 has similar characteristics as another column of the dataset 127 step 417 may be performed; otherwise inquiry 413 may be performed. In step 417 the score may be a similarity score with the most similar column of the dataset 127 which has been standardized.

In inquiry 413, it may be determined if average value lengths, average number of words and number of formats of the column are below respective predefined thresholds. If it is the case, step 417 may be performed otherwise the standardization score algorithm 163 may be run in step 415 on the attribute values of the attribute or column 167. In step 417 the score may be set to value 0. After executing step 415, step 417 may be performed. In this case, step 417 may comprise setting the score to a value which is the output or result of running the standardization score algorithm.

In other words, if none of the previous criteria (403-411) applied, check (inquiry 413) for the following conditions for the column 167:

Data class category is 'text',
The number of different formats is above a threshold t1,
The average length of the values is above t2,
The average number of words is above t3, and if
The cardinality (number of distinct values/total number of values) is above t4.

Longer values or values containing a larger number of words or having a large number of different formats and values are more likely to be candidate for standardization as values with a constant format or well defined different values. Note that here more advanced criteria could be used, such as analyzing if there are obvious outliers in the frequency distributions of the values, like some values having an unusually low frequency compared to the other value. If it is the case, a deeper analysis (163) may be run on this column that will search for nearly duplicates. In other words, in case the general statistics about the column 167 (data type, number of formats, distribution of value lengths, number of words, value distributions, etc. which may be part of metadata 161) indicate that the column contains data which could potentially have a standardization problem because of their nature, a deeper analysis using standardization algorithm 163 in these columns whose purpose is to get a good guess of the % of values in that column which have one or more potential related values that could represent the same entity although the values are not exactly the same.

Steps 401-417 may be performed for each column or attribute of the dataset 127.

FIGS. 5A-5D illustrate steps for creating clusters of attribute values of the attribute 167 using a bitmap.

Figure 5A:
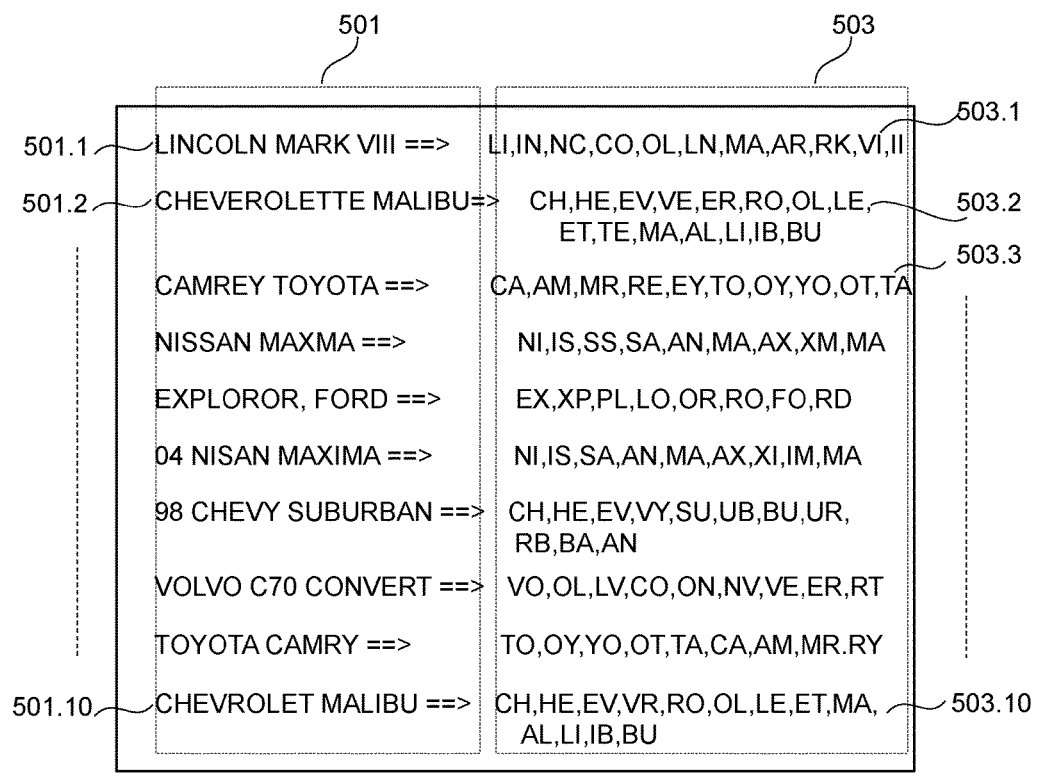

FIG. 5A depicts the list of attribute values 501.1 to 501.10 to be processed. Each of the attribute values 501.1-10 is associated with the respective set of bigrams 503.1-503.10 in the attribute value. Attribute values 501.1 to 501.10 may be distinct values. The attribute values 501.1-10 may be stored in a column 501 and corresponding sets of bigrams 503.1-503.10 may be stored in column 503 of the table shown in FIG. 5A.

From the first step that is illustrated by FIG. 5A, the list of bigrams to be found in the attribute or column 501 is determined.

For each attribute value 501.1-10 a respective set of bits 502.1-10 may be created as illustrated in FIG. 5B. In the bitmap 505, each pair of bigrams and associated attribute values is represented by a bit. Bit value of 0 at a position represents that a particular bigram does not exist in the attribute value and 1 indicates that the particular bigram exists in the attribute value. This may end up having a large binary number associated with each attribute value. The 10 attribute values 501.1-10 of the input have 63 different bigrams.

The length of the bitmap may be determined by the number of different bigrams occurring at least once in the full dataset containing attribute values 501. The length of the bitmap indicates the number of bits that have a value of 1 in the bitmap (referred to as set of bits) associated with each attribute value (e.g., 63 bits).

Figure 5C:
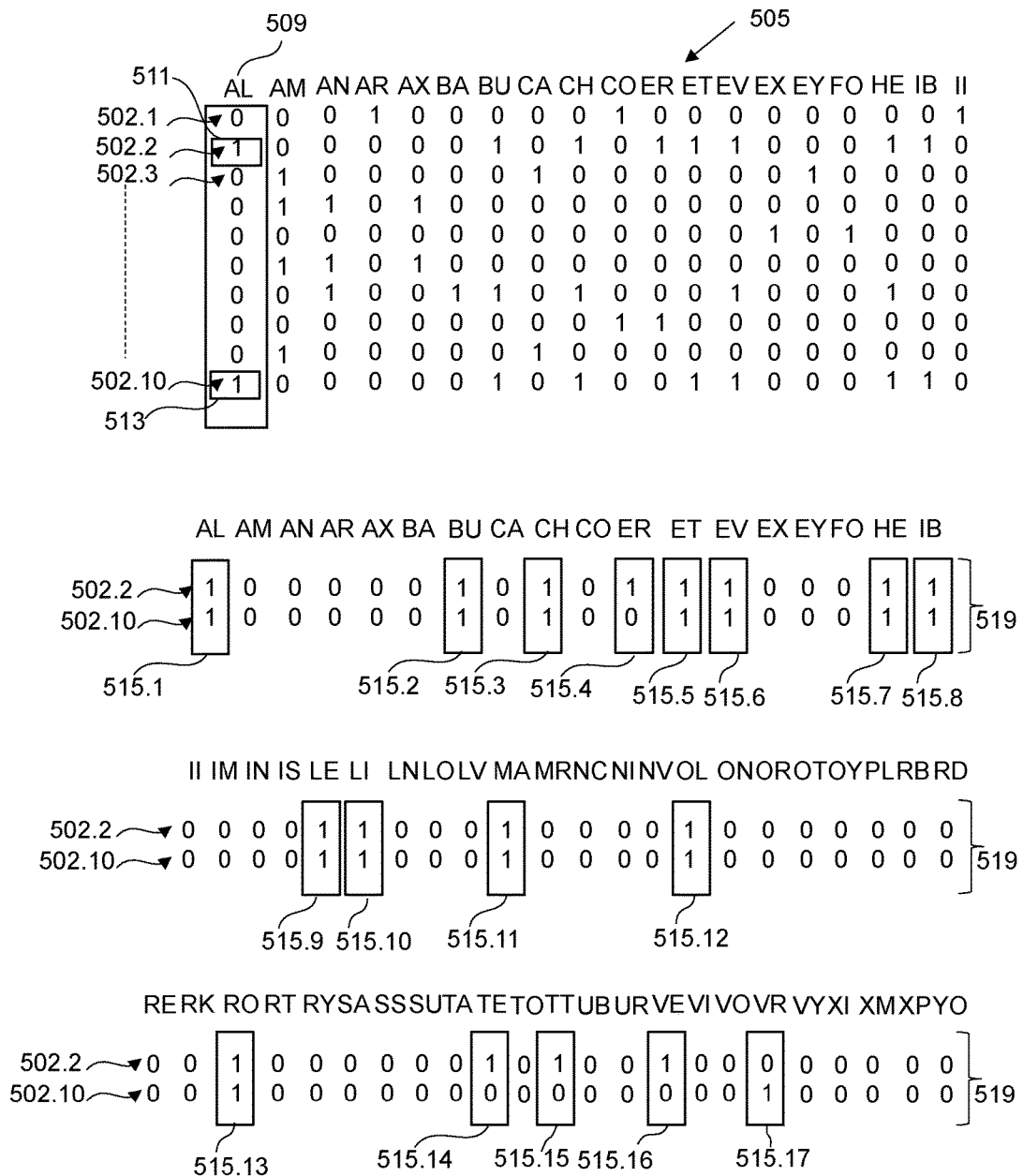

In a following step as illustrated in FIG. 5C, a first bit position (e.g., most left bit of the bitmap) is used to find those bits that return 1 and which are blocked together and compared. As illustrated in FIG. 5C, the first position may comprise bit position 509 which represents the bigram "AL". In this example, the 2nd and 10th rows return 1 as values of bits 511 and 513 respectively.

The 2nd and 10th rows or attribute values 501.2 and 501.10 may be compared by comparing the bits within them. The bits of each attribute values 501.2 and 501.10 are further separately listed in FIG. 5C.

For comparing the bits a similarity factor (e.g., the pair-wise bigram-based similarity score) may be calculated for the two attribute values 501.2 and 501.10. The similarity factor Sim(501.2, 501.10) may be defined as follows Sim (501.2, 501.10)=(S1∩S2)/(S1US2), where S1 is the bits that are set to 1 for attribute value 501.2 and S2 is the bits that are set to 1 for attribute value 501.10. The union (S1US2) refers to the pairs of bits 515.1-515.17, wherein each pair comprises bits corresponding to the two attribute values 501.2 and 501.10 and comprises at least one bit that is set to 1. In the example of FIG. 5C, there are 17 pairs 515.1-17. The intersection (S1∩S2) refers to the pairs of bits of 515.1-3 and 515.5-13, wherein each pair comprises two bits that are set to 1. In the example of FIG. 5C, there are 12 pairs.

Thus the similarity factor may be: Sim(501.2,501.10)=12/17=0.71.

Since the Similarity is above threshold (e.g. 0.25), the attribute values 501.1 and 501.10 are clustered together as one cluster. One of them may become a cluster leader. Subsequent rows may be only compared to this cluster leader.

Since sufficient clusters are not identified, the step described in FIG. 5C may be repeated by doing a left shift to identify a second bit position 520 which corresponds to bigram "AM" as shown in FIG. 5D. Rows 3, 4, 6 and 9 (represented by set of bits 502.3, 502.4, 502.6 and 502.9) of the bitmap 505 or attribute values 501.3, 501.4, 501.6 and 501.9 return 1 and are compared with each other by calculating the similarity factor as defined above.

Sim (501.3, 501.4)=0.05 is below threshold 0.25 thus attribute values 501.3 and 501.4 are not clustered together.

Sim (501.3, 501.6)=0.05 is below threshold 0.25 thus attribute values 501.3 and 501.6 are not clustered together.

Sim (501.3, 501.9)=0.72 is higher than the threshold, thus attribute values 501.3 and 501.9 are clustered together in cluster 523.

Sim (501.4, 501.6)=0.80 is higher than the threshold, thus attribute values 501.4 and 501.6 are clustered together in cluster 521.

Sim (501.4, 501.9) and Sim (501.6, 501.9) are not performed as attribute value 501.9 was already moved to cluster 523.

Sim (501.2, 501.3)=0 is below threshold 0.25 thus attribute values 501.2 and 501.3 are not clustered together.

Sim (501.2, 501.4)=0.04 is below threshold 0.25 thus attribute values 501.2 and 501.4 are not clustered together.

Since sufficient clusters (3) are identified, an exit may be performed. The following 3 clusters are identified, values within which may further be compared with another string algorithm (UNCERT, etc.).

Cluster 519 has attribute values 501.2 and 501.10: CHEVEROLETTE MALIBU and CHEVROLET MALIBU.

Cluster 523 has attribute values 501.3 and 501.9: TOYOTA CAMRY and CAMREY TOYOTA.

Cluster 521 has attribute values 501.4 and 501.6: NISSAN MAXMA and NISAN MAXIMA.

The exit condition may be quantified as follows: If over 25% of the attribute values 501.1-10 are covered in the clusters with more than 1 record then the above exit may be performed (e.g., no repeating of step of FIG. 5C is required).

The scoring may be performed as follows:

If 25% and above covered in clusters with more than 1 record

Score=1.0

Else

Score=Max(1.0,(% covered)*4/100).

For example, if the number of attribute values for which at least one duplicate attribute value has been found is 25% of the total number of attribute values, the result may be maximized to 1.0 because enough number of attribute values with a potential duplicate value is found which gives a high confidence that the standardization is needed for the attribute values.

The present method may have be advantageous as comparing 10 distinct values would have traditionally required n*(n+1)/2 comparisons. So from 55 comparisons, the present method brought down the comparison to just 5.

Another example for processing the bitmap 505 in order to find duplicates may comprise the following steps: splitting the bitmaps in groups of 64 bigrams (which corresponds to 64 bits per attribute value) which can be easily processed by the CPU as 64 bits long numbers. Thus, for each attribute value N long number may be obtained. The attribute values may be sorted by their first long numbers and compare within sorted result each attribute value with only the next M values following it (e.g., M=10 values) in order to find pairs of duplicate values. This operation may be repeated by sorting by the 2nd long number of each attribute value and determine if in that order new pairs of similar or duplicate values can be found, etc.

In another example, a method for determining a data standardization score for an attribute is provided. The method comprises: providing predefined rules for determining based on metadata and characteristics of an attribute, whether data quality of attribute values would increase if a standardization rule is applied to the attribute values; providing a data standardization score algorithm and a criterion to compare a calculated data standardization score to, the calculated data standardization score reflecting whether data quality of attribute values would increase if a standardization rule is applied to the attribute values; receiving a set of attribute values for an attribute and metadata/characteristics for the attribute; (e.g., characteristics may be determined for the attribute); determining, based on metadata/characteristics for the attribute, whether a clear indication to carry or not to carry out standardization is available; in response to finding the clear indication, setting a respective value for the data standardization score; in response to not finding the clear indication, running the data standardization score algorithm on the attribute values; comparing the data standardization score value to the criterion to determine whether data standardization is to be applied on the attribute. An example approach to calculate the data standardization score may comprise: converting each attribute value (string) to a respective set of bigrams; determining all bigrams present in the attribute values; representing bigrams present in the attribute values as binary numbers; determining similarity scores of attribute values pairs based on how many bigrams the attribute value pairs share, the determining being done by bit operations on the binary numbers representing the attribute values; clustering the attribute values based on the similarity score.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for determining a data standardization score for an attribute of a dataset, the method comprising:
   providing attribute metadata descriptive of the attribute;
   providing a data standardization score algorithm for finding potential duplicates in attribute values and calculating a data standardization score accordingly, the calculated data standardization score reflecting whether data quality of attribute values would increase if a standardization rule is applied to the attribute values;
   determining, based on the metadata for the attribute, whether an indication to carry or not to carry out standardization is available for at least part of attribute values of the dataset;
   in response to finding the indication to carry out standardization, setting a respective value for the data standardization score;
   in response to not finding the indication to carry out standardization, running the data standardization score algorithm on the at least part of attribute values of the dataset;
   comparing, by a processor, the data standardization score value to a predefined criterion to determine whether data standardization is to be applied on the attribute;
   wherein the data standardization score algorithm is configured for:
      converting each attribute value to a respective set of bigrams;
      determining all bigrams present in the attribute values;
      representing bigrams present in the attribute values as bits, resulting in a bitmap representing the presence of the bigrams in the attribute values;
      grouping the attribute values using bitwise operations on the bitmap, wherein each group comprises attribute values of the attribute values having a predefined number of common bigrams; and
      calculating the data standardization score using a number of groups; and
   applying data standardization on the attribute to transform data to a predefined format in response to determining data standardization is to be applied on the attribute.

2. The method as recited in claim 1, wherein the attribute values are distinct values of the attribute that are obtained by a deduplication algorithm.

3. The method as recited in claim 1, wherein the attribute values are all attribute values of the attribute in the data set.

4. The method as recited in claim 1 further comprising:
   providing a set of criterions, the determining, based on the metadata for the attribute, whether the indication to carry or not to carry out standardization is available comprising: checking each of the criterions for the values of the attribute.

5. The method as recited in claim 4, wherein the set of criterions comprises one or more of the following:
   the attribute values are resulting from a data standardization algorithm;
   the attribute values are resulting from an ETL process that is applied on source data that has been standardized;
   the attribute is representing a primary or foreign key of the dataset;
   the attribute values have a predefined data class;
   the attribute has similar characteristics as another attribute of the dataset, wherein values of the other attribute are standardized; a number of different formats of the attribute is above a number of formats threshold;
   an average length of the attribute values is above a length threshold;
   an average number of words of the attribute is above a number of words threshold; and
   a fraction of the distinct values is above a fraction threshold.

6. The method as recited in claim 1, wherein the data standardization score algorithm comprises an algorithm for calculating similarity between attribute values and calculating the score based on the similarities.

7. The method as recited in claim 1, wherein the grouping of the attribute values comprises:
   performing a bitwise operation for each pair of attributes values of the attribute values, recursively building each group by including a first pair of attribute values in the group and including each further pair of attribute values that shares at least one attribute value with previously included pairs of the group.

8. The method as recited in claim 1, wherein the grouping of the attribute values comprises:
   selecting a first bit position in the bitmap and checking which set of attribute values have the bigram corresponding to the first bit position;
   grouping attribute values having the bigram corresponding to the first bit position in one or more groups, wherein each group comprises attribute values of the set of attribute values that are determined based on pairwise bigram-based similarity scores, the pairwise bigram-based similarity score reflecting how many bigrams two attribute values have in common; and in case the number of groups is smaller than a predefined threshold, repeating the selecting and grouping steps using a second bit position and non-grouped attribute values until the number of groups is higher than the predefined threshold or until all bits are processed.

9. The method as recited in claim 8, wherein the pairwise bigram-based similarity score is determined using a number of bit pairs having same bits of two attribute values.

* * * * *